United States Patent
Digrazia et al.

(10) Patent No.: US 11,710,090 B2
(45) Date of Patent: *Jul. 25, 2023

(54) MACHINE-LEARNING MODELS TO ASSESS CODING SKILLS AND VIDEO PERFORMANCE

(71) Applicant: SHL (India) Private Limited, Mumbai (IN)

(72) Inventors: Joseph Digrazia, Washington, DC (US); Ken Lahti, Portland, OR (US); Paul Dekoekkoek, Kansas City, MO (US); Mathijs Affourtit, Boulder, CO (US); Varun Aggarwal, Gurgaon (IN); Rohit Takhar, Gurgaon (IN)

(73) Assignee: SHL (India) Private Limited, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,350

(22) Filed: Mar. 29, 2021

(65) Prior Publication Data
US 2021/0216939 A1 Jul. 15, 2021

Related U.S. Application Data

(63) Continuation-in-part of application No. 16/171,043, filed on Oct. 25, 2018, now Pat. No. 10,963,226.

(30) Foreign Application Priority Data

Oct. 25, 2017 (IN) .............................. 201711037678

(51) Int. Cl.
*G06F 8/41* (2018.01)
*G06Q 10/0639* (2023.01)
(Continued)

(52) U.S. Cl.
CPC ......... *G06Q 10/06393* (2013.01); *G06F 3/16* (2013.01); *G06F 8/43* (2013.01);
(Continued)

(58) Field of Classification Search
CPC ..... G06F 8/30; G06F 8/33; G06F 8/37; G06F 8/41; G06F 8/75; G06F 17/27
See application file for complete search history.

(56) References Cited

U.S. PATENT DOCUMENTS 8,522,083 B1 8/2013 Cohen et al.
8,856,725 B1 10/2014 Anderson et al.
(Continued)

OTHER PUBLICATIONS

IPO, First Examination Report for Indian Patent Application No. 201711037678, dated Sep. 28, 2021, 7 pages.
(Continued)

*Primary Examiner* — Duy Khuong T Nguyen
(74) *Attorney, Agent, or Firm* — IP Spring

(57) ABSTRACT

A method includes receiving uncompilable code from a candidate. The method further includes extracting features from the uncompilable code. The method further includes outputting, with a coding machine-learning model, compilable code based on the uncompilable code and the extracted features. The method further includes generating a coding score based on the uncompilable code and the compilable code. The method further includes receiving first media of one or more answers to questions provided by the candidate during an interview. The method further includes outputting, with a media machine-learning model, one or more corresponding ratings for the one or more answers. The method further includes generating a media score based on the one or more corresponding ratings. The method further includes generating a total score based on the coding score and the media score.

20 Claims, 10 Drawing Sheets

(51) Int. Cl.
*G06F 3/16* (2006.01)
*G10L 25/57* (2013.01)
*G06N 20/00* (2019.01)
*G06Q 10/1053* (2023.01)
*H04N 5/76* (2006.01)
*H04N 5/38* (2006.01)

(52) U.S. Cl.
CPC ......... *G06N 20/00* (2019.01); *G06Q 10/1053* (2013.01); *G10L 25/57* (2013.01); *H04N 5/38* (2013.01); *H04N 5/76* (2013.01)

(56) References Cited

U.S. PATENT DOCUMENTS

| | | |
|---|---|---|
| 9,898,387 B2 | 2/2018 | Rodmell |
| 10,585,780 B2 | 3/2020 | Woulfe et al. |
| 2004/0003335 A1 | 1/2004 | Gertz et al. |
| 2008/0288512 A1 | 11/2008 | Tung et al. |
| 2009/0070734 A1 | 3/2009 | Dixon et al. |
| 2011/0252394 A1 | 10/2011 | Sharma et al. |
| 2014/0032435 A1* | 1/2014 | Desai .................. G06Q 50/01 705/321 |
| 2014/0317009 A1* | 10/2014 | Bilodeau ............ G06Q 10/1053 705/321 |
| 2015/0135166 A1 | 5/2015 | Tarlow et al. |
| 2015/0339940 A1* | 11/2015 | Aggarwal ................ G09B 7/02 704/235 |
| 2016/0364692 A1* | 12/2016 | Bhaskaran ......... G06Q 10/1053 |
| 2017/0212829 A1 | 7/2017 | Bales et al. |
| 2017/0269907 A1 | 9/2017 | Goetz et al. |
| 2017/0278421 A1 | 9/2017 | Du et al. |
| 2019/0114321 A1* | 4/2019 | Lam .................. G06F 16/24522 |
| 2019/0164016 A1* | 5/2019 | Allen ..................... G06N 5/022 |
| 2019/0164107 A1* | 5/2019 | Upadhyay ......... G06Q 10/06398 |

OTHER PUBLICATIONS

USPTO, Final Office Action for U.S. Appl. No. 16/171,043, dated Feb. 18, 2020, 40 pages.

USPTO, Non-final Office Action for U.S. Appl. No. 16/171,043, dated Jul. 14, 2020, 54 pages.

USPTO, Notice of Allowance for U.S. Appl. No. 16/171,043, dated Nov. 27, 2020, 13 pages.

USPTO, Non-final Office Action for U.S. Appl. No. 16/171,043, dated Sep. 11, 2019, 29 pages.

* cited by examiner

300

MACHINE-LEARNING MODELS TO ASSESS CODING SKILLS AND VIDEO PERFORMANCE

CROSS REFERENCE TO RELATED APPLICATIONS

This application is a continuation-in part of U.S. patent application Ser. No. 16/171,043, entitled "Generating Compilable Code from Uncompilable Code," filed Oct. 25, 2018, which claims the benefit of Indian Provisional Patent Application No. 201711037678, entitled "System to Grade and Provide Feedback on Programs That Do Not Compile," filed Oct. 25, 2017, each of which is incorporated by reference in its entirety.

BACKGROUND

The specification relates to an application that uses machine-learning models to output an assessment of coding skills and video performance.

When a programmer is learning how to code, it is more important that the programmer show an ability to solve a programming problem using the correct logic, which is also known as an algorithmic approach, as opposed to the ability to follow and reproduce the syntax of a language. Syntax can be learned quickly for a new programming language, but it is more difficult to develop an ability to code with the correct logic.

Several automated systems for testing coding skills and providing feedback have been developed. One method for evaluation of the code uses test cases, which neither provides good judgment to the evaluator nor proper actionable feedback to the candidate. Another method provides a grade on the logical correctness of a program according to a rubric. However, none of these methods handle code that does not compile. As a result, a programmer will not receive feedback on how to improve the code. Even worse, a programmer may miss out on grades or job opportunities.

When candidates are interviewing for a position, such as a job, it can be overly time consuming for a person to make time for all the interviews. Currently software exists for streamlining some aspects of job applications, such as filtering for particular degrees or skills, but software is not available to automate the interviewing steps.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments generally relate to a computer-implemented method to generate compilable code from uncompilable code and use a media machine-learning model to output ratings for one or more answers provided by a candidate. The method includes receiving uncompilable code from a candidate. The method further includes generating compilable code from the uncompilable code. The method further includes outputting, with a coding machine-learning model, patterns from the uncompilable code. The method further includes generating a coding score based on the uncompilable code, the compilable code, and the patterns. The method further includes receiving first media of one or more answers to questions provided by the candidate during an interview. The method further includes outputting, with a media machine-learning model, one or more corresponding ratings for the one or more answers. The method further includes generating a media score based on the one or more corresponding ratings. The method further includes generating a total score based on the coding score and the media score.

In some embodiments, one or more parameters of the media machine-learning model are modified based on supervised learning based on training data that identifies second media of candidates and corresponding ratings of the second media from one or more users. In some embodiments, the operation further comprises generating a user interface for the one or more users to provide the corresponding ratings of the second media, wherein the user interface includes an audio clip that corresponds to the first media, a textual version of the questions, and an option for providing the corresponding ratings. In some embodiments, the operation further comprises before outputting the one or more corresponding ratings, performing an iterative process to refine the media machine-learning model until a set of ratings output by the media machine-learning model match a set of ratings provided by the one or more users within a predetermined percentage. In some embodiments, the first media is audio and the operations further comprise receiving a video of the candidate and separating the audio from the video. In some embodiments, one or more parameters of the coding machine-learning model are modified based on supervised learning based on training data that include labels for code as compilable or uncompilable, wherein the coding machine-learning model is trained to identify patterns in the uncompilable code that cause it to be uncompilable. In some embodiments, the coding machine-learning model receives the uncompilable code after a make compilable method is applied to the uncompilable code, after a rule relaxation method is applied to the uncompilable code, or after a combination of the make compilable method and the rule relaxation method are applied to the uncompilable code. In some embodiments, the operations further comprise identifying the candidate for review by a user for a job, a promotion, or a project if the total score meets a predetermined value. In some embodiments, a parse tree or a symbol table (ST) is generated to extract features from the uncompilable code. In some embodiments, one or more parameters of the coding machine-learning model are modified by labeling the compilable code or comparing the extracted features in the compilable code to labeled high-quality compilable code.

In some embodiments, non-transitory computer storage medium with instructions stored thereon that, when executed by one or more computers, cause the one or more computers to perform operations, the operations comprising: receiving uncompilable code from a candidate, generating compilable code from the uncompilable code, outputting, with a coding machine-learning model, patterns from the uncompilable code, generating a coding score based on the uncompilable code, the compilable code, and the patterns, receiving first media of one or more answers to questions, the first media provided by the candidate during an interview, outputting, with a media machine-learning model, one or more corresponding ratings for the one or more answers, generating a media score based on the one or more corresponding ratings, and generating a total score based on the coding score and the media score.

In some embodiments, one or more parameters of the media machine-learning model are modified based on supervised learning based on training data that identifies second media of candidates and corresponding ratings of the second media from one or more users. In some embodiments, the operation further comprises generating a user interface for the one or more users to provide the corresponding ratings of the second media, wherein the user interface includes an audio clip that corresponds to the first media, a textual version of the questions, and an option for providing the corresponding ratings. In some embodiments, the operation further comprises before outputting the one or more corresponding ratings, performing an iterative process to refine the media machine-learning model until a set of ratings output by the media machine-learning model match a set of ratings provided by the one or more users within a predetermined percentage. In some embodiments, the first media is audio and the operations further comprise receiving a video of the candidate and separating the audio from the video.

In some embodiments, a system comprises one or more processors and a memory coupled to the one or more processors that stores instructions executed by the one or more processors, the instructions operable to perform operations comprising: receiving uncompilable code from a candidate, generating compilable code from the uncompilable code, outputting, with a coding machine-learning model, patterns from the uncompilable code, generating a coding score based on the uncompilable code, the compilable code, and the patterns, receiving first media of one or more answers to questions, the first media provided by the candidate during an interview, outputting, with a media machine-learning model, one or more corresponding ratings for the one or more answers, generating a media score based on the one or more corresponding ratings, and generating a total score based on the coding score and the media score.

In some embodiments, one or more parameters of the media machine-learning model are modified based on supervised learning based on training data that identifies second media of candidates and corresponding ratings of the second media from one or more users. In some embodiments, the operation further comprises generating a user interface for the one or more users to provide the corresponding ratings of the second media, wherein the user interface includes an audio clip that corresponds to the first media, a textual version of the questions, and an option for providing the corresponding ratings. In some embodiments, the operation further comprises before outputting the one or more corresponding ratings, performing an iterative process to refine the media machine-learning model until a set of ratings output by the media machine-learning model match a set of ratings provided by the one or more users within a predetermined percentage. In some embodiments, the first media is audio and the operations further comprise receiving a video of the candidate and separating the audio from the video.

Other aspects may include corresponding methods, systems, apparatus, and computer program products.

The systems and methods described herein advantageously generate compilable code from uncompilable code. As a result, the compilable code functions, the compilable code may take up less memory, and the compilable code works more efficiently than uncompilable code. Uncompilable code may be properly assessed to discover the intent of the programmer. In some embodiments, the systems and methods generate semantic feedback that addresses the logic of the code to help the programmer learn how to improve their code.

The systems and methods described herein may additionally describe using a media machine-learning model to output ratings for answers provided by a candidate. As a result of the media machine-learning model, the process of rating candidates is more efficient, and the analysis is more uniform when software makes the determination instead of the variability seen by individuals rating different candidates.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System

Figure 1:
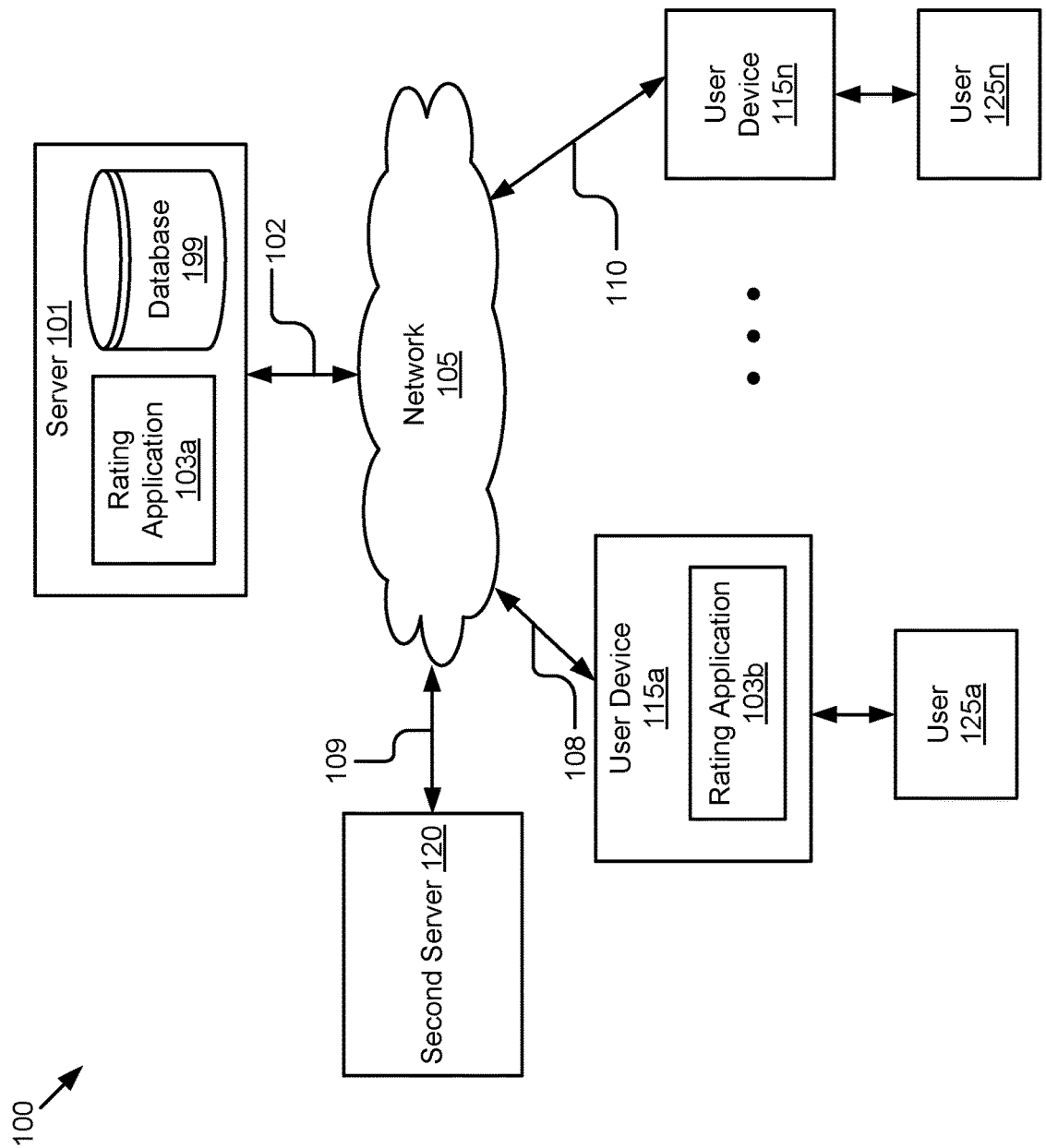
FIG. 1 illustrates a block diagram of an example system that generates compilable and/or parseable code from uncompilable code according to some embodiments.

FIG. 1 illustrates a block diagram of an example system 100 that uses machine-learning models to output an assessment of coding skills and video performance. The illustrated system 100 includes a server 101, user devices 115a, 115n, a second server 120, and a network 105. Users 125a, 125n may be associated with respective user devices 115a, 115n. In some embodiments, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The server 101 may include a processor, a memory, and network communication capabilities. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the server 101 sends and receives data to and from one or more of the user devices 115a, 115n and the second server 120 via the network 105. The server 101 may include a rating application 103a and a database 199. The database 199 may be used as cloud storage.

The rating application 103a may be code and routines operable to generate compilable code from uncompilable code. In some embodiments, the rating application 103a receives uncompilable code, generates compilable code by one or more of (1) identifying and correcting syntax errors in the uncompilable code and (2) using an n-gram based token prediction model and/or generates parseable code, extracts features from the compilable code or the uncompilable code, and generates a coding machine-learning model that recognizes patterns from extracted features in the compilable code. In some embodiments, the rating application 103a uses a media machine-learning model to output media ratings for a candidate that answered interview questions.

In some embodiments, the rating application 103a may be implemented using hardware including a field-programmable gate array (FPGA) or an application-specific integrated circuit (ASIC). In some embodiments, the rating application 103a may be implemented using a combination of hardware and software.

The database 199 may include information related to the operation of the rating application 103. For example, the database 199 may store examples of high-quality compilable code, a coding machine-learning model, a media machine-learning model, uncompilable code, compilable code generated from the uncompilable code, etc. The database 199 may be used as cloud storage.

The user device 115 may be a computing device that includes a memory and a hardware processor. For example, the user device may include a desktop computer, a mobile device, a tablet computer, a mobile telephone, a wearable device, a mobile device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, the rating application 103b may be stored on a user device 115a. The rating application 103 may include a thin-client rating application 103b stored on the user device 115a and a rating application 103a that is stored on the server 101. For example, the rating application 103b stored on the user device 115a may receive code including uncompilable code from a programmer. The user device 115a may transmit the code to the rating application 103a stored on the server 101, which generates compilable and/or parseable code from the uncompilable code, scores the compilable code, and generates feedback. The rating application 103a may transmit graphical data for the feedback to the user device 115, which displays the feedback on a display of the user device 115.

The second server 120 may include a processor, a memory, and network communication capabilities. The second server 120 may access the network 105 via signal line 109. The second server 120 may provide data to the rating application 103. For example, the second server 120 may provide examples of high-quality compilable code. In another example, the second server 120 may be a business server that requests a list of candidates from the rating application 103.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the server 101, in practice one or more networks 105 may be coupled to these entities.

Example Computing Device

Figure 2:
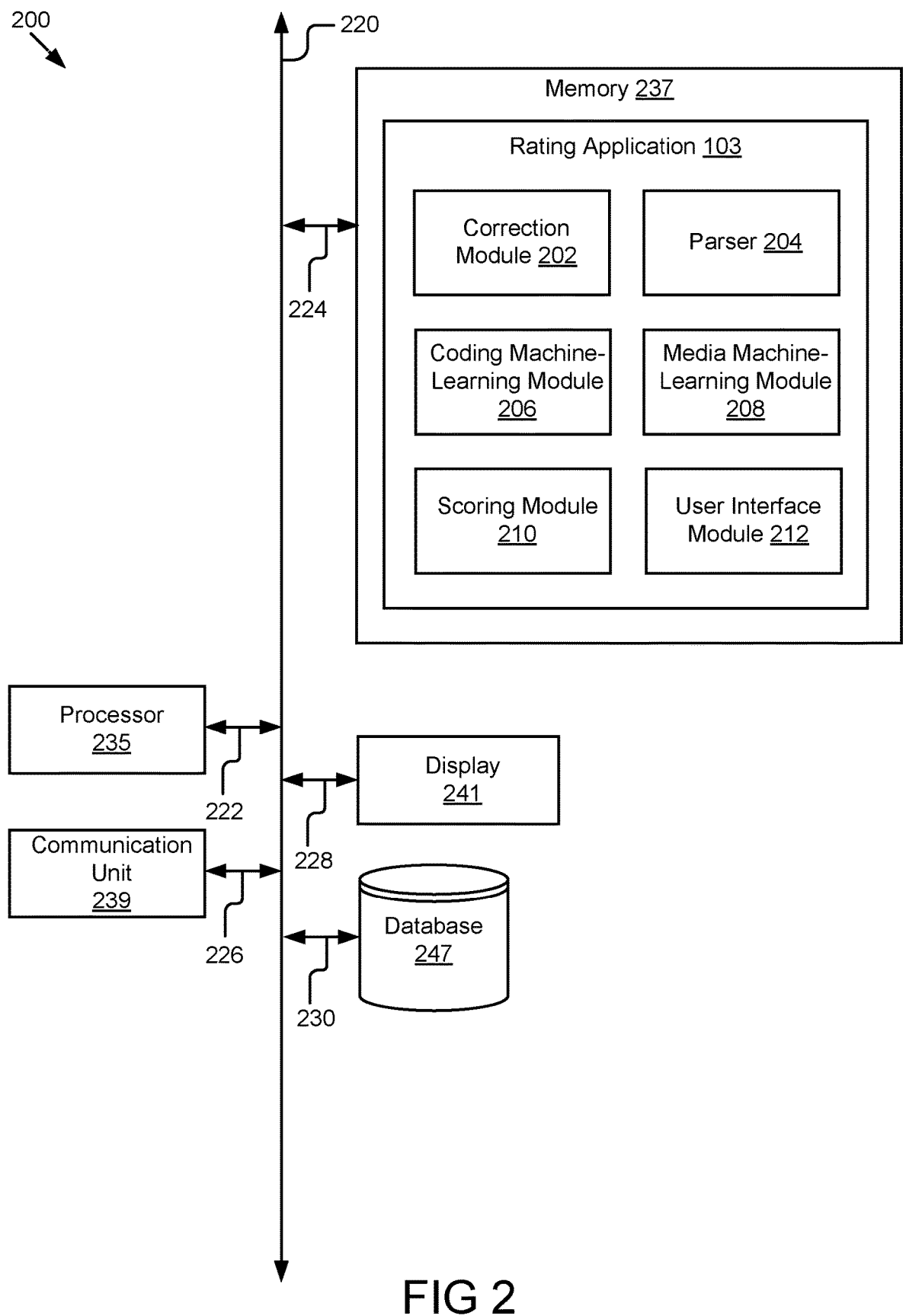
FIG. 2 illustrates a block diagram of an example computing device that generates compilable and/or parseable code from uncompilable code according to some embodiments.

FIG. 2 illustrates a block diagram of an example computing device 200 that uses machine-learning models to output an assessment of coding skills and video performance. The computing device 200 may be a server 101 or a user device 115. The computing device 200 may include a processor 235, a memory 237, a communication unit 239, a display 241, and a database 247. Additional components may be present or some of the previous components may be omitted depending on the type of computing device 200. For example, if the computing device 200 is the server 101, the computing device 200 may not include the display 241. A rating application 103 may be stored in the memory 237. In some embodiments, the computing device 200 may include other components not listed here, such as a battery, a sensor, etc. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the rating application 103, which is described in greater detail below. The memory 237 is coupled to the bus 220 for communication with the other components via signal line 224.

The communication unit 239 transmits and receives data to and from at least one of the user device 115 and the server 101 depending upon where the rating application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the server 101, depending on where the rating application 103 may be stored. In some embodiments, the communication unit 239 includes a wireless transceiver for exchanging data with the user device 115, server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the rating application 103. For example, the display 241 may render graphics to display feedback about code submitted by a programmer. The display 241 is coupled to the bus 220 for communication with the other components via signal line 228.

The database 247 may be a non-transitory computer-readable storage medium that stores data that provides the functionality described herein. In embodiments where the computing device 200 is the server 101, the database 247 may include the database 199 in FIG. 1. The database 247 may be a DRAM device, a SRAM device, flash memory or some other memory device. In some embodiments, the database 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The database 247 is coupled to the bus 220 for communication with the other components via signal line 230.

The rating application 103 may include a correction module 202, a parser 204, a coding machine-learning module 206, a media machine-learning module 208, a scoring engine 210, and a user interface module 212.

The correction module 202 corrects uncompilable code. In some embodiments, the correction module 202 includes a set of instructions executable by the processor 235 to correct the uncompilable code. In some embodiments, the correction module 202 is stored in the memory 237 of the computing device 200 and can be accessible and executable by the processor 235.

The correction module 202 may receive uncompilable code from a programmer. The uncompilable code may be written in any programming language, such as C, C++, Java, Python, C#, JavaScript, assembly, perl, ruby, SQL, visual basic, etc. The uncompilable code may be part of a program that also includes some compilable code or the entire program may be considered uncompilable code because one uncompilable portion of the program may render the entire program uncompilable. For purposes of this application, the program is described as uncompilable code, even though portions of the program may be compilable. The uncompilable code may be submitted as part of a programming class, a job interview, or any other purpose. In some embodiments, the correction module 202 identifies locations within the uncompilable code where a compilation error occurs before correcting the uncompilable code.

The correction module 202 determines how the programmer intended the uncompilable code to work by fixing failures in the uncompilable code to adhere to grammar rules and syntax rules of the programming language. The correction module 202 generates compilable code by: (1) identifying and correcting corrects syntax errors in the uncompilable code; and (2) using an n-gram based token prediction model. These approaches are referred to as the make compilable method below.

In some embodiments, the correction module 202 corrects syntax errors code by fixing common errors, for example, by inserting a semicolon, balancing parentheses, declaring undeclared variables, or adding a return statement. The correction module 202 may perform multiple passes of the uncompilable code to fix the grammar rules and the syntax errors until the uncompilable code is compilable.

In some embodiments, the correction module 202 generates compilable code by predicting the correct line at the position of a compilation error based on previous keywords. For example, the correction module 202 may generate compilable code that includes insertion of a data type, a variable name, etc. and not make changes that introduce new logical units, such as operators, expressions, or control structures.

The correction module 202 may use an n-gram based token prediction model to predict the correct line of code at the position of the compilation error. Other models may be used to generate the compilable code, such as a long-short term memory (LSTM) unit of a recurrent neural network (RNN). In some embodiments, the token prediction model may include a first coding machine-learning model that determines whether a first statement has a compiler error or is uncompilable. Alternatively or additionally, a compiler may identify a line that includes the first statement. The token prediction model may include a coding second machine-learning model that predicts a corrected statement based on other statements in the uncompilable code. The first coding machine-learning model and the second coding machine-learning model may be generated by the coding machine-learning module 206 discussed in greater detail below.

If the corrected statement makes the uncompilable code compilable, the correction module 202 may accept the corrected statement. If the uncompilable code is still uncompilable with the corrected statement, the correction module 202 may continue to try subsequent predicted lines until the uncompilable code is compilable. In some embodiments, the correction module 202 attempts to make the uncompilable code compilable by trying the subsequent statements either until the uncompilable code is compilable or a threshold number of attempts have occurred. If the subsequent statements fail to make the uncompilable code compilable after the threshold number of attempts have occurred, the correction module 202 may ignore the portion of the uncompilable code that fails to become compilable.

The parser 204 applies a rule relaxation method to extract features from the uncompilable code. In some embodiments, the parser 204 includes a set of instructions executable by the processor 235 to extract features from the uncompilable code. In some embodiments, the parser 204 is stored in the memory 237 of the computing device 200 and can be accessible and executable by the processor 235.

In some embodiments, the parser 204 applies the rule relaxation method after the correction module 202 generates the compilable code. In other embodiments, the parser 204 applies the rule relaxation method to the uncompilable code if the correction module 202 is not able to generate the compilable code. In some embodiments, the parser 204 parses uncompilable code using the rule relaxation method. Although the parser 204 is described below as performing actions on uncompilable code, the parser 204 may be understood to apply the same steps to compilable code.

In some embodiments, the parser 204 generates a parse tree, an abstract syntax tree (AST), or a symbol table (ST). The parser 204 may not generate an AST for uncompilable code. The parser 204 traverses the abstract syntax tree to extract features from the uncompilable code. A typical compiler performs several steps: tokenization, parsing based on grammar, type checking, linking, and optimization. The parser 204 relaxes the rules used in the various compilation steps to generate the parse tree or the ST for the uncompilable code. In some embodiments, the parser 204 identifies correct statements in the uncompilable code, uses a rule relaxation method to accept or reinterpret grammatically incorrect statements, and skips the grammatically incorrect statements that are not parseable.

When a compiler performs tokenization of code, it does not generally lead to an error. Non-meaningful tokens get identifies as potentially variable/function names to be disambiguated later. For instance, an undeclared variable, or a variable with an operation not matching its data type, are accepted at this stage. A spelling error in a token, such as rturn in rturn flag is wrongly identified as a class identifier, whose definition will be expected to be linked in later steps.

In the parsing step, errors occur when the code violates the grammar rules. The parser 204 skips the statements in the uncompilable code that violate the grammar rules. For instance, the parser 204 skips the statement int [ ] arr=new int[ ]. The parser 204 builds an Imperfect AST in the parsing steps that captures the good part of the code (e.g., the parts of the code that do not violate grammar rules or other rules) while skipping the parts of the code that are uncompilable. In some examples, the parser 204 skips around 6.2% of the uncompilable code.

When a compiler performs type checking or linking steps, the compiler identifies errors in situations where operations of variable or declarations of variables do not match. The parser 204 performs a rule relaxation method by identifying that a declaration in the uncompilable code is wrong and, responsive to the declaration being wrong, ignoring the wrong declaration and assuming missing declarations. Continuing with the example above, the operation is accepted even if the data type doesn't match, so the usage of undeclared variables and rturn is considered a class. The parser 204 creates an Imperfect ST for the uncompilable code.

While the corrections performed by the correction module 202 may be better at inferring an intent of the programmer by correcting the non-understandable statements in the uncompilable code, if the correction module 202 cannot correct the statements in the uncompilable code, the correction module 202 fails. In some examples, the correction module 202 fails with 52% of the code. Conversely, the parser 204 may skip or misconstrue portions of the uncompilable code, but it can still parse a significant portion of the uncompilable code. In some examples, the parser 204 parses 95% of the uncompilable code. In some embodiments, both the correction module 202 and the parser 204 perform actions on the uncompilable code to maximize the advantages of both approaches to correcting and parsing the uncompilable code.

The features extracted by the parser 204 may describe keywords, expressions, expression dependency, and control context. The description of keywords may include a count of all keywords, tokens, operators, etc., such as the number of times a "*" operator appears or loop and conditional tokens, such as when "for" and "if" appear. The description of the expressions may include and abstraction of the expression. For example, y=x % 2 is abstracted to a notation such as v:2::op:% c:'2', which denotes an expression having two variables, one modulus operator, and the constant "2." The number of occurrences of each abstract expression are counted. The description of expression dependency may describe a data dependency that is captured when the variable in one expression is used in another expression. For example, the expression x<y, which contains a relational operator (<) and two variables is dependent on the expression y++, which contains a post increment operator (++) and one variable. This is denoted using the notation v:1::op:++ (←)v:2::op:relation. The occurrences of each dependency matching such abstractions is counted. This is repeated for each unique pair of dependencies that appear in a response. The control context may describe that separate counts are maintained for each of the three properties described above according to the control-context (loops and conditional statements) in which they appear. For example, an expression whose abstract notation matches v:2::op:%" " c "'2' is counted separately if it appears within an if statement as against a loop like a for or a while as against an if statement within a for.

The coding machine-learning module 206 modifies parameters for a coding machine-learning model to output compilable code from uncompilable code. In some embodiments, the coding machine-learning module 206 includes a set of instructions executable by the processor 235 to modify parameters for a coding machine-learning model to output compilable code from uncompilable code. In some embodiments, the coding machine-learning module 206 is stored in the memory 237 of the computing device 200 and can be accessible and executable by the processor 235.

In some embodiments, the coding machine-learning module 206 generates multiple coding machine-learning models to form an iterative process. For example, the coding machine-learning module 206 may modify the parameters of a first coding machine-learning model that outputs a determination of whether a first statement has a compiler error or is uncompilable. The coding machine-learning module 206 may modify the parameters of the first coding machine-learning model based on training data that labels code as compilable or uncompilable in order to identify patterns in code that would cause it to be uncompilable.

In some embodiments, the coding machine-learning module 206 modifies the parameters of a second coding machine-learning model that outputs a prediction for a corrected statement based on other statements in the uncompilable code. The coding machine-learning module 206 may modify the parameters for the second coding machine-learning model based on training data that labels code as compilable or uncompilable in order to identify patterns in code that would cause it to be uncompilable.

In some embodiments, the coding machine-learning module 206 modifies the parameters of a third coding machine-learning model that uses patterns from extracted features in the compilable code to output compilable code. The coding machine-learning module 206 may receive training data in the form of a set of labelled uncompilable code and features extracted from the uncompilable code after the uncompilable code was processed by the correction module 202 using the make compilable method, the parser 204 using the rule relaxation method, or a combination of the make compilable method and the rule relaxation method. The coding machine-learning module 206 may modify the parameters of the third coding machine-learning model using the extracted features.

In some embodiments, the coding machine-learning module 206 receives training data in the form of labeled high-quality code where the high-quality code is compilable code that did not require modification to become compilable. The coding machine-learning module 206 uses the labeled high-quality compilable code to modify the parameters of a coding machine-learning model. The coding-machine-learning module 206 modifies the coding machine-learning model based on the labeled compilable codes with certain corrections to perform as well as a coding machine-learning model generated from the uncompilable code. The coding machine-learning module 206 may reuse the coding machine-learning model generated from the labeled compilable code on other codes, such as uncompilable codes.

In some embodiments, the coding machine-learning module 206 modifies the parameters for the coding machine-learning model using an iterative process. For example, the coding machine-learning module 206 may modify parameters of the coding machine-learning model based on supervised learning based on training data that includes labeled high-quality compilable code to modify the parameters for the coding machine-learning model. The coding machine-learning module 206 may perform an iterative process by reusing the coding machine-learning model generated with labeled high-quality compilable code for an uncompilable code from a programmer. In some embodiments, this is best achieved by not using a number of test cases passed as a feature in training the coding machine-learning model using the labeled high-quality compilable code. In some embodiments, the coding machine-learning module 206 also monitors for a comparable correlation and a high means absolute error (MAE) value because those are indicators of a systemic error that would result in a poorly working coding machine-learning model.

The following is an example use case for modifying the parameters of coding machine-learning models. The coding machine-learning module 206 modifies the parameters of the coding machine-learning models based on responses collected on the questions provided in Table 1 below.

TABLE 1

Sample size for different questions

| Question Name | Sid | #UC | #CC |
|---|---|---|---|
| countCacheMiss | 24 | 370 | 106 |
| balancedParentheses | 132 | 355 | 70 |
| grayCheck | 43 | 367 | 175 |
| transposeMultMatrix | 48 | 407 | 182 |
| eliminateVowelString | 62 | 392 | 182 |

The coding machine-learning module 206 used linear regression, linear regression with $L_1$ regularization (LASSO), linear regression with $L_2$ regularization (Ridge regression), decision trees, random forests, and support vector machines (SVMs). The coding machine-learning module 206 reports results for LASSO ($\alpha=1$) with $\lambda$ varied from 0 to 4. The coding machine-learning module 206 determined that linear models worked best among all the techniques, indicating linearity in the inherent structure of the problem space. The reports for LASSO are described because it outperformed all other techniques.

The coding machine-learning model that output the best cross-validation (three-fold) correlation was selected. The coding machine-learning model was trained on data from three problems (Sid 43, 48, 62), and tested on data from all five problems. For the problems used in training, the response set was split into a 70-30 train-test set. For the other two problems, all responses were used in the test set. The performance of the model on the unseen problem set helped demonstrate how well the models generalized to questions whose sample was not used in training. The Pearson correlation coefficient (r) and mean absolute error (MAE) ($\Sigma|y_{pred}-y|/n$) as evaluation metrics to judge the performance of the coding machine-learning models.

The coding machine-learning module 206 compares the efficacy of various approaches based on choices made at different steps to determine: criteria #1 whether the make compilable method, the rule relaxation method, or a combination of the make compilable method and the rule relaxation method is more accurate in scoring the uncompilable code; criteria #2 how accurately the uncompilable code can be scored and how it compares to expert scoring engines and/or automatic scoring of compilable codes; and criteria #3 whether a coding machine-learning model trained for compilable codes can be reused for uncompilable codes.

The coding machine-learning module 206 performed an analysis using five programming problems. The problems were chosen such that the algorithms to solve the problems had varying complexities. A subset of programs written by programmers for the problems were scored by experts. The set included both compilable and uncompilable codes.

The coding machine-learning module 206 generated separate coding machine-learning models for the compilable codes and the uncompilable codes to output a prediction of expert scores. For the uncompilable codes, the coding machine-learning module 206 modified the parameters of coding machine-learning modules using each of the rule relaxation method and the make compatible method and compared their accuracy. The coding machine-learning module 206 also determined that the models for compilable code could be reused for predicting scores for uncompilable code.

TABLE 2

Accuracy of models built using the RR and MC approach to grade uncompilable codes. Metrics: r and MAE

| Sid | Sample Size | Sample Size (MC) | RR (all) | | MC | | RR (MC set) | |
|---|---|---|---|---|---|---|---|---|
| | | | r | MAE | r | MAE | r | MAE |
| 24 | 370 | 171 | 0.71 | 0.52 | 0.78 | 0.44 | 0.71 | 0.51 |
| 132 | 355 | 165 | 0.70 | 0.43 | 0.63 | 0.45 | 0.65 | 0.44 |
| 43 | 367 | 175 | 0.72 | 0.47 | 0.86 | 0.25 | 0.78 | 0.49 |
| 48 | 407 | 230 | 0.66 | 0.50 | 0.65 | 0.54 | 0.72 | 0.43 |
| 62 | 392 | 198 | 0.59 | 0.65 | 0.74 | 0.55 | 0.58 | 0.68 |
| Mean | | | 0.68 | 0.52 | 0.73 | 0.45 | 0.69 | 0.51 |
| Median | | | 0.70 | 0.50 | 0.74 | 0.45 | 0.71 | 0.49 |

TABLE 3

Accuracy of models built using a sample of compilable and uncompilable codes to grade uncompilable codes. Metrics: r and MAE.

| Sid | CC Model | | CC Model with dist. Fixed | | CC Model w/o TC and dist. Fixed | | Uncompilable | |
|---|---|---|---|---|---|---|---|---|
| | r | MAE | r | MAE | r | MAE | r | MAE |
| 24 | 0.74 | 0.75 | 0.74 | 0.47 | 0.74 | 0.44 | 0.75 | 0.48 |
| 132 | 0.75 | 0.84 | 0.75 | 0.41 | 0.74 | 0.41 | 0.68 | 0.45 |
| 43 | 0.72 | 0.68 | 0.72 | 0.47 | 0.79 | 0.46 | 0.79 | 0.43 |
| 48 | 0.60 | 0.77 | 0.60 | 0.65 | 0.64 | 0.60 | 0.62 | 0.56 |
| 62 | 0.56 | 1 | 0.56 | 0.58 | 0.64 | 0.52 | 0.69 | 0.57 |
| Mean | 0.67 | 0.81 | 0.67 | 0.52 | 0.71 | 0.49 | 0.71 | 0.50 |
| Median | 0.72 | 0.77 | 0.72 | 0.47 | 0.74 | 0.46 | 0.69 | 0.48 |

The coding machine-learning module 206 received uncompilable code from college seniors majoring in computer science that took a 90 minute assessment in a proctored environment during which they attempted two programming questions. The coding machine-learning module 206 determined that the uncompilable code addressed five problems and was written in Java. The topics covered by the questions spanned iterative/recursive algorithms, trees, and graphs and other algorithms like the shortest job first, etc. The coding machine-learning module 206 used on average, 143 compilable and 378 uncompilable responses per problem to modify the parameters of coding machine-learning models. In total, 2606 codes were used in the use case.

Two professional software engineers with 4-7 years of experience each shared the task of grading the responses. The engineers followed a rubric defined to score codes on a scale of 1-5. Before beginning the grading exercise, the engineers underwent a one-week workshop where they learned how to interpret the rubric and participated in mock grading exercises. The engineers were given special instructions to score the codes only based on the intended logic of the programmer and not to penalize based on the quantum or type of compilation errors. The correlation between the scores of the two engineers was on an average 0.72 across the questions in the data set.

To determine criteria #1 whether the make compilable method or the rule relaxation method is more accurate in scoring the uncompilable code, the coding machine-learning module 206 trained the coding machine-learning models on the uncompilable codes using each of the make compilable method and the rule relaxation method. The make compilable method failed to correct all the codes. Specifically, the make compilable method was only able to correct 48% of the codes, but performed better than the rule relaxation method on this set. The mean (median) r for the make compilable method was 0.73 (0.74), and it was 0.69 (0.71) for the rule relaxation method (on the make compilable method set). The make compilable method also performed better for three out of the five problems, worse for the fourth, and similar for the fifth. As a result, the make compilable method is better than relaxing grammar. This implies that the code correcting algorithm does extrapolate the user's intent. However, it is unable to do so for 52% of the codes.

The coding machine-learning module 206 also trained some coding machine-learning models with a combination of the make compilable method and the rule relaxation method (RRMC approach). To determine criteria #2 how accurately the uncompilable code can be scored and how it compares to expert scoring engines and/or automatic scoring of compilable codes, the RRMC approach has a mean correlation of 0.71, which is described in the second to last column of Table 3. Only for one problem was the correlation fairly low at 0.62. This shows that the RRMC approach provides competitive results.

The coding machine-learning module 206 also trained coding machine-learning models using compilable codes to predict their labels. The accuracy of these coding machine-learning models is much higher (on average, 0.85 as compared to 0.71 for uncompilable). This is because the coding machine-learning module 206 has access to a number of test-cases passed for the compilable code. This feature alone provides a correlation of 0.73 on average with expert ratings. Without this feature, the average correlation for compilable code falls to 0.70, comparable to 0.71 of uncompilable code.

The coding machine-learning module 206 does not have access to the test case feature for uncompilable codes. The value of the number of test cases passed feature is 0 for codes that the correction module 202 could not make compilable. The coding machine-learning module 206 uses the number of test cases passed by the compilable program for codes corrected by the make compilable method. Even when the correction module 202 corrects the uncompilable codes, the correction module 202 does not semantically correct them to result in an informative number of test-cases passed.

The coding machine-learning module 206 determined that for criteria #3 a coding machine-learning model trained for compilable codes can be reused for uncompilable codes after normalization. The coding machine-learning module 206 used the RRMC approach to derive features and train the coding machine-learning model on compilable codes. This way, the coding machine-learning module 206 does not require additional labelled uncompiled code for training the coding machine-learning model. The first column in Table 3 shows the results of using the coding machine-learning model trained on compilable codes directly. Though the correlation is a little poorer (0.67 compared to 0.71), the MAE is significantly higher (0.81 compared to 0.50).

The coding machine-learning module 206 improved the training of the coding machine-learning model by dropping the number of test-cases passed as an aspect of training the coding machine-learning models on compilable code. As discussed above, the number of test-cases passed is not predictive of scores for the uncompilable code in the same way it is for compilable codes.

A comparable correlation and high mean absolute error (MAE) signals a systematic error. To test this hypothesis, the coding machine-learning module 206 modified the distribution of the coding machine-learning model output to match with that of the uncompilable code ratings (on the training set, explained in more detail below). The results in Table 3 show that by filing the distribution, there is a dramatic improvement in the MAE. Specifically, filing the distribution results in a MAE of 0.42 as compared to 0.50 for a coding machine-learning model trained using uncompilable codes. Removing the test case feature resulted in a further improvement where the mean r became 0.71 and MAE 0.49, which is almost the same as models trained on uncompilable codes.

Figure 3:
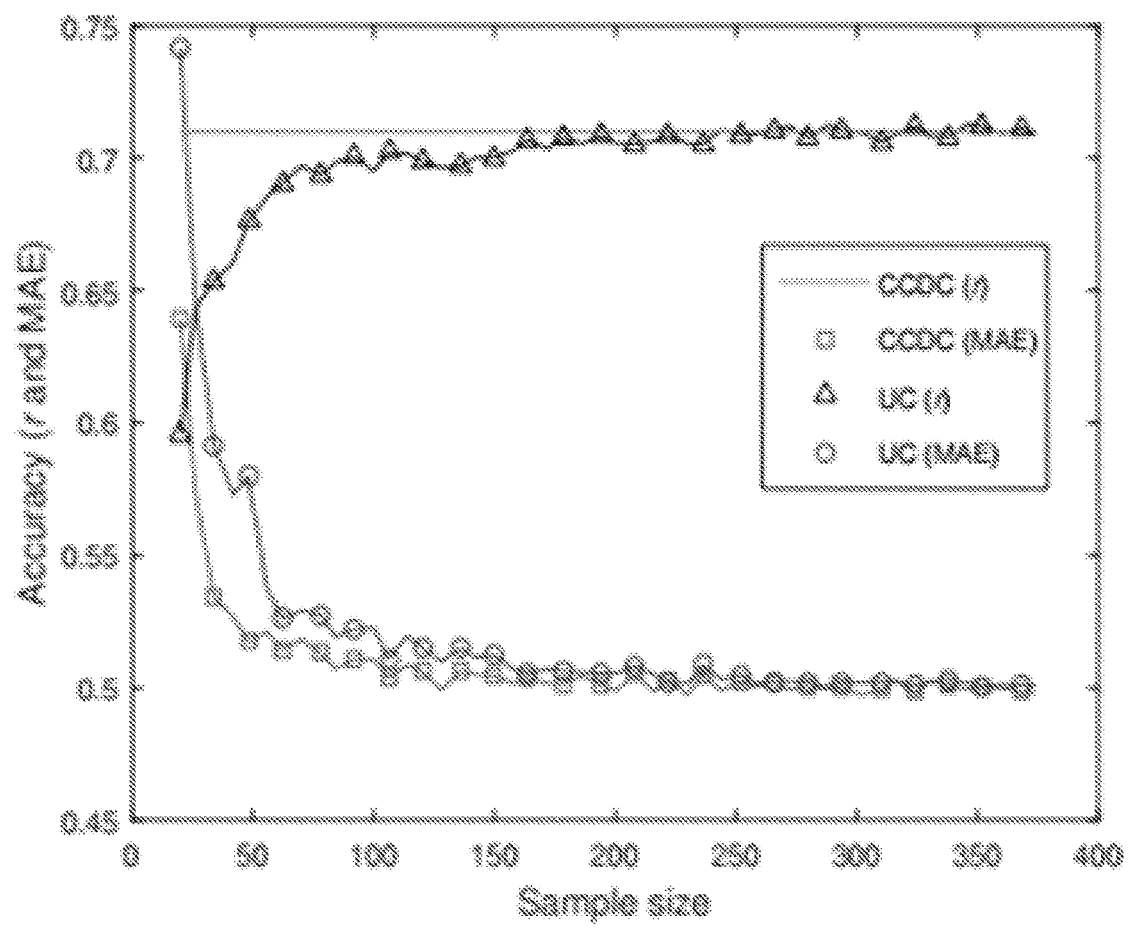
FIG. 3 illustrates the accuracy of coding machine-learning models built on a sample of compilable codes with distribution correction and uncompilable codes according to some embodiments.

The scores predicted by the compilable code models are transformed such that their distribution matches the expert score distribution of the uncompiled code. The coding machine-learning module 206 performs an equipercentile transformation on the training set of the uncompilable code. The equipercentile method is commonly used in test equating. Here, scores with the same percentile on the two distributions are considered equivalent. Scores from one distribution are mapped to the equipercentile score on the other distribution. This suggests that expert scores are needed on the uncompilable code. The coding machine-learning module 206 worked to analyze the hypothesis that distribution matching would require a much smaller sample of labelled codes as compared to training a fresh coding machine-learning model. To confirm this, the coding machine-learning module 206 performs a simulation by bootstrapping different sample sizes of labelled uncompilable codes and tests the mean r/MAE for the distribution correction approach (CCDC) versus training fresh coding machine-learning models with the uncompilable code. The results are shown in FIG. 3, which illustrates an example graph 300 of the accuracy of coding machine-learning models trained on a sample of compilable codes with distribution correction and uncompilable codes. The x-axis denotes the sample size used and the y-axis denotes accuracy in terms of r and MAE.

The MAE for the distribution correction approach as a function of the sample size reduces much faster as compared to training fresh models. The distribution correction approach has the right r throughout. To attain stability within 1% of MAE and r of the asymptotic accuracy, 140 samples are needed for the distribution correction approach and 220 samples for building fresh models. This means a reduction of about 33% in labeling effort. This becomes significantly large for creating models for multiple programming languages and for multiple raters. For 10 languages and 3 raters, it would lead to rating 2400 additional codes.

The media machine-learning module 208 modifies parameters for a media machine-learning model to output a media score for a candidate. In some embodiments, the media machine-learning module 208 includes a set of instructions executable by the processor 235 to modify parameters for a media machine-learning model to output the media score for the candidate. In some embodiments, the media machine-learning module 208 is stored in the memory 237 of the computing device 200 and can be accessible and executable by the processor 235.

The media machine-learning module 208 may receive training data that includes media of a candidate being interviewed, such as a video or audio of the interview of the candidate. In some embodiments, the audio is taken from a video of the candidate that was interviewed, but the media machine-learning module 208 separates the audio from the image files. For example, this can be beneficial to remove any risk of bias being associated with an assessment of the candidate based on their appearance. The media machine-learning module 208 trains the media machine-learning model using the training data, for example, by using supervised learning, and outputs one or more media scores for the candidate. For example, the media machine-learning module 208 outputs a media score for each question answered by a candidate. The candidates may be applying for a job, a promotion, a job critique, etc.

In some embodiments, the media machine-learning module 208 receives training data that includes media of candidates and ratings from one or more users that assess a candidate according to different factors. The training data may include the information provided by users via the user interfaces in FIGS. 4-5. For example, the training data may include a series of questions, a series of audio clips with answers from candidates, and corresponding ratings from raters (i.e., labels). In some embodiments, the training data may also include all the data associated with situations where multiple raters rated an answer and disagreements occurred with the answer, including the different ratings assigned by different raters; how the rating was resolved by a moderator; and identification of media where the rater identified the media as including no information, needing additional review, and/or that the media contained personal information. The media machine-learning module 208 uses the labelled ratings to modify the parameters of a medial machine-learning model.

In some embodiments, the media machine-learning module 208 receives training data that includes media of candidates and the media machine-learning model determines how to differentiate between the different media and rate them accordingly. For example, the media machine-learning module 208 may use unsupervised learning to cluster attributes of different candidates into positive attributes and negative attributes, and output ratings accordingly.

In some embodiments, the media machine-learning module 208 modifies the parameters for the media machine-learning model using an iterative process. For example, the media machine-learning module 208 may use training data that includes the series of questions, the series of audio clips with answers from candidates, and corresponding ratings from raters modify the parameters for the media machine-learning model. The media machine-learning model may then receive new audio clips and ratings. A user may review the ratings and modify the ratings if they disagree with the ratings. The media machine-learning module 208 modifies the one or more parameters of the media machine-learning model based on the supervised learning based on the training data that identifies the media of candidates and corresponding ratings of the media from the user (i.e., feedback). In some embodiments, the media machine-learning module 208 may perform an iterative process for refining the media machine-learning model until a set of ratings output by the media machine-learning module match a set of ratings provided by one or more users within a predetermined percentage. For example, the media machine-learning module 208 may instruct the user interface module 212 to generate a request for users to review ratings for a media machine-learning model until there is 80% agreement (or 90%, 95%, etc.) between the ratings output from the media machine-learning model and corresponding ratings from a user.

The scoring engine 210 generates scores for a candidate. In some embodiments, the scoring engine 210 includes a set of instructions executable by the processor 235 to generate the scores. In some embodiments, the scoring engine 210 is stored in the memory 237 of the computing device 200 and can be accessible and executable by the processor 235.

In some embodiments, the scoring engine 210 generating a coding score based on the uncompilable code, the compilable code, and the patterns output from the coding machine-learning model. The scoring engine 210 may also generate a media score from ratings output from the media machine-learning model or from ratings provided by a user via the ratings app user interface illustrated in FIG. 4 (or a different ratings app user interface). In some embodiments, the coding score and the media score are for the same candidate and the scoring engine 210 generates a total score for the candidate. In some embodiments, the scoring engine 210 identifies a candidate for a user when the total score exceeds a predetermined score. For example, the scoring engine 210 may identify the candidate or a group of candidates for a user to review for employment, promotion, project, or other purposes based on the total score meeting a predetermined value, such as $^{80}/_{100}$ or any other values defined by the scoring engine 210.

In some embodiments, the scoring engine 210 receives compilable code from the correction module 202, extracted features derived from the abstract syntax tree and the symbol table from the parser 204, and a coding machine-learning model from the coding machine-learning module 206. The scoring engine 210 may score the extracted features as compared to high-quality compilable code based on the coding machine-learning model. In some embodiments, the scoring engine 210 scores compilable code on a variety of factors, such as programming ability, programming practices, time complexity, and a total score where the total score is a combination of any other scores generated by the scoring engine 210. The scoring engine 210 may score uncompilable code on a variety of factors as well, including programming ability, programming practices, and a total score but not time complexity. In some embodiments, the scoring engine 210 penalizes uncompilable code so that it does not have the same score as compilable code. For example, the scoring engine 210 may deduct a portion of the total score based on a penalty for the uncompilable code. The scoring engine 210 may instruct the user interface module 212 to provide the programmer with a coding score or coding scores, which the user interface module 212 supplements with additional information.

In some embodiments, the scoring engine 210 maintains a record of a programmer's scores. For example, the scoring engine 210 may generate a user profile that includes the username, password, security questions, confirmations of disclaimers, etc. The scoring engine 210 may update the user profile with information about all tests taken by the programmer. The scoring engine 210 may add to the test-taking information all instances where a programmer provided code including compilable and uncompilable code, the accuracy of corresponding scores, an overall score for the programmer, etc.

The following is a case study on how the rating application 103 including the scoring engine 210 was generated and modified for a company that wanted the ability to assess entry level software engineers for jobs. The company was looking to find candidates who can think of a correct algorithmic approach to solve a given programming problem. The scoring engine 210 generated scores for programming ability, programming practices, time complexity, and a total score. The total score is a combination of the scores for programming ability, programming practices, and time complexity. The scoring engine 210 introduced a penalty for non-compilation. This helped score a compilable code higher than uncompilable codes, if they had the same score on all metrics.

A total of 29,600 candidates took the test. Out of these 54% had compilable code, 24% had a blank code, and 22% had uncompilable code. The programming ability score for candidates with compilable and uncompilable codes is shown below in Table 4. The company used a cut-off of 3 or above on the programming ability score to interview candidates. Out of 29,600 candidates, 2,457 candidates were selected for an interview. This was an addition of 26% candidates as compared to a system that would automatically exclude any candidate with uncompilable code. After the interview, 565 selected candidates had uncompilable codes, which results in an additional 19% of hired candidates. As a result of the rating application 103 with the developed scoring engine 210, the company was able to hire much more efficiently. In addition, many worthy candidates who would have been excluded by a traditional scoring system were hired.

TABLE 4

Distribution of PA scores for candidates with compilable and uncompilable programs. The table also includes the number of candidates selected for interview and the number of candidates who were hired.

| | Rubric Definition | Compilable | Uncompilable |
|---|---|---|---|
| 1 | Code unrelated to given problem | 3361 | 1979 |
| 2 | Appropriate keywords and tokens are present | 3264 | 2125 |
| 3 | Right control structure exists with missing data dependency | 2547 | 1440 |
| 4 | Correct with inadvertent errors | 2955 | 1017 |
| 5 | Completely correct | 3828 | — |
| ≥3 | Selected for interview | 9330 | 2457 |
| — | Hired | 2986 | 565 |

Table 5 below shows a couple of examples of the uncompiled code used by hired candidates. One observes that the logic of the uncompilable code is correct, but they do not compile due to incorrect declaration or use of data types. Another error is the wrong placement of return with respect to parentheses. Based on the analysis it was determined that candidates with near-correct codes (semantically) make compilation errors due to lack of knowledge of using the language. They also sometimes are unable to debug silly errors. One reason for this could be that compiler generated error messages are not instructive enough to correct the errors.

TABLE 5

Examples of candidate submissions with uncompiling codes who got hired.

| Program 1 | Program 2 |
|---|---|
| Input: String | Input: String |
| Expected output: String without vowels | Expected output: 1 if the brackets are balanced, otherwise 0 |

| Program 1 | Program 2 |
|---|---|
| 1  class Solution. | 1  public class Parentheses |
| 2  { | 2  { |
| 3  public static String vowel(String st) | 3      public static int brackets (String sir) |
| 4  { | 4      { |
| 5      char strChar[ ]=st.toCharArray ( ) : | 5          Stack<char> s=new Stack<char>( )< |
| 6      String rev=""; | 6          for(int i=0;i<str.length( );i++){ |
| 7      for(int i=0;i<st . length( ) ; i++) { | 7              char st = str . charAt(i). |
| 8      if(st.charAt(i)=="a" \|\| st.charAt(i)=="A"){ | 8              if(st=='(' \|\| st== '{' \|\| st== '[' ) |
| 9          rev=rev+""; | 9                  s . push(str.charAt(i)): |
| 10     }else if(st.charAt(i)=="e" \|\| st.charAt(i)=="E"){ | 10             if(s.empty( )){ |
| 11         rev=rev+""; | 11                 s . push(str.charAt(i)); |
| 12     }else if(st.charAt(i)=="i" \|\| st.charAt(i)=="I"){ | 12                 continue; |
| 13         rev=rev+""; | 13             } else{ |
| 14     }else if(st.charAt(i)=="o" \|\| st.charAt(i)=="O"){ | 14                 char cur= s.top( ); |
| 15         rev=rev+""; | 15                 if(str=='}' && cur == '{' { |
| 16     }else if(st.charAt(i)=="u" \|\| st.charAt(i)=="U"){ | 16                     s.pop( ); |
| 17         rev=rev+""; | 17                 } else if(st=='}' && cur == '{') { |
| 18     }else{ | 18                     s.pop( ); |
| 19         rev=rev+st . charAt(i); | 19                 } else if(st==')' && cur == '{') { |
| 20     } | 20                     s . pop( ): |
| 21     return rev ; | 21                 } |
| 22  } | 22             } |
| 23  //Missing return statement | 23         } |
| 24  } | 24         if(!s.empty( )) |
| 25  } | 25             return 0; |
| 26 | 26         return 1; |
| 27 | 27     } |
| 28 | 28  } |

| Compiler Errors | Compiler Errors |
|---|---|
| Lines 8, 10, 12, 14, 16: Incomparable types char and String | Line 5: Unexpected type char |
| Line 23: Missing return statetnent | Line 16: Undefined symbol top. |
| Actual corrections to be made | Actual corrections to be made |
| Lines 8, 10, 12, 14, 16: Replace "with' | Line 5: Replace char with Character |
| Line 23: Include return statement in the main block | Lise 16: Replace top( ) with peek( ) |

In some embodiments, the scoring engine 210 receives ratings output from the media machine-learning model. For example, the scoring engine 210 may receive a rating for each answer provided by a candidate during an interview. The scoring engine 210 may generate a media score based on each of the ratings. In some embodiments, the ratings may be associated with different weights and the scoring engine 210 may generate a media score based on the ratings and the weights.

The user interface module 212 generates user interfaces. In some embodiments, the user interface module 212 includes a set of instructions executable by the processor 235 to generate the user interface. In some embodiments, the user interface module 212 is stored in the memory 237 of the computing device 200 and can be accessible and executable by the processor 235.

The user interface module 212 may generate user interfaces for different types of users. A first type of user is a person that assesses candidates, such as an employer or a business that screens candidates for an employer. This type of user may be further divided into a rater that provides a rating for an interview of a candidate and a moderator that reviews interviews where the interview has already been reviewed by a rater and a possible disagreement between multiple raters exists. The user interface module 212 generates a user interface for a user that assesses candidates that includes options for providing coding projects for a candidate, provides a window for rating media from a candidate, and a window with an overall assessment of the candidate that describes one or more of the candidate's coding abilities and media rating information. In some embodiments, the user interface module 212 generates a user interface for a first rater to rate different candidates on a first question, a second rater to rate the different candidates on a second question, etc.

Figure 4:
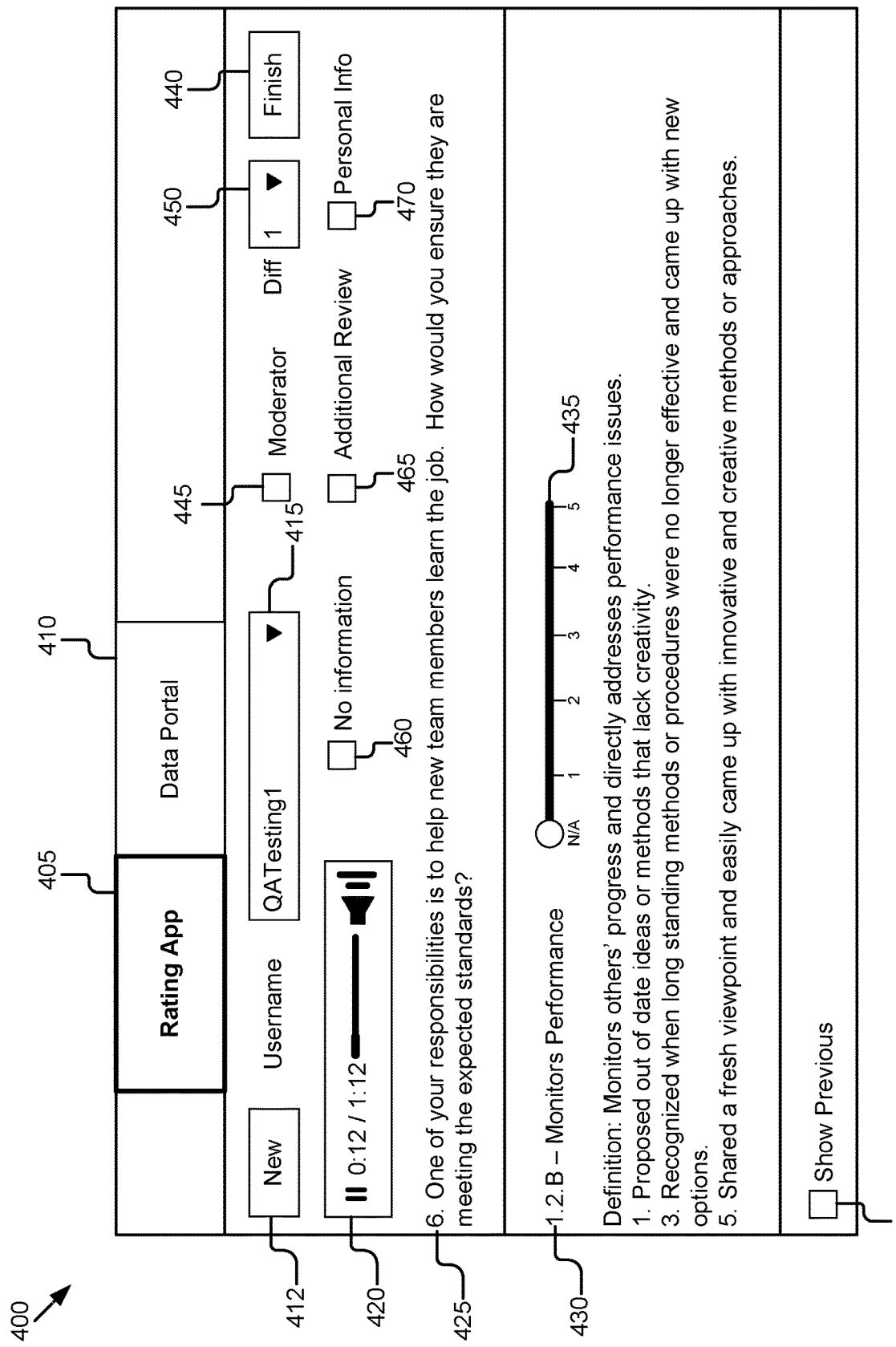
FIG. 4 illustrates an example user interface for a user to assess the performance of a candidate according to some embodiments.

Turning to FIG. 4, an example user interface 400 is illustrated for a user to assess the performance of a candidate according to some embodiments. In this example, a video of a candidate was recorded and the audio was separated from the video (e.g., to avoid any implication of bias that could occur if a user saw an image of the candidate, to conserve storage space, and/or bandwidth, etc.). Although the user interface 400 is illustrated with audio options, the user interface 400 is easily modifiable to assess video as well.

In this example, the user interface 400 has a "rating app" tab 405 selected. Selecting the "data portal" tab 410 results in the user interface module 212 providing options for how to select a project task. The user interface 400 includes information that a rater uses to rate a candidate. The user interface 400 includes a "new" button 412 for obtaining media to assess. In this example, the user interface 400 is already showing audio to be assessed. The user interface 400 further includes the username of the rater (i.e. QATesting1) that assesses the candidate from a "username" dropdown box 415 that may include a list of usernames for the rater.

The user interface 400 includes a progress box 420 that shows how much of the audio has been played (i.e., 12 seconds out of 72 seconds) and that the audio is currently playing. Below the progress box 420 is a competency definition 425 that is a textual version of the current question being asked of the candidate. In this example, the sixth question asked of the candidate is: "One of your responsibilities is to help new team members learn the job. How would you ensure they are meeting the expected standards?"

The user interface 400 includes a rubric 430 that provides an explanation for how the rater should assess the candidate's response. In this example, the rubric for how a candidate monitors the performance of others includes definitions for a rating of 1 (proposed out of date ideas or methods that lack creativity), 3 (recognized when long standing methods or procedures were no longer effective and came up with new options), and 5 (shared a fresh viewpoint and easily came up with innovative and creative methods or approaches) out of a media score of 5. Although the media score is illustrated on a scale of 1 to 5, the scale value can be modified to use any suitable scale of rating (e.g., 1 to 10, high-medium-low, etc.). The user interface 400 includes an option for providing a rating. In this example, the option is a slider bar 435. The rater adjusts the slider bar 435 to provide a rating for the candidate's answer and clicks the "finish" button 440 to finish the assessment.

The user interface 400 includes a "moderator" box 445 to flag the audio for review by a moderator. In some embodiments, audio is reviewed by at least two raters and clicking the "moderator" box 445 results in the rater performing a moderator function where the rater only reviews audio if there has been a disagreement between the media scores given by previous raters. The user interface 400 further includes a difference drop-down box 450 where the moderator reviews audio only if the difference between the media scores of previous raters is at least the value of the number in the box. In this example, the moderator would review the audio if a first rater gave the audio a media score of 4 and a second rater gave the audio a media score of 5, resulting in a difference of 1. In some embodiments where the user interface 400 is for a moderator, selecting the "show previous" box 455 causes the user interface module 212 to update the user interface 400 to show the media score of previous raters. Once a moderator rates audio, the issue is considered resolved and the moderator's media score is accepted as the media score.

In some embodiments, the user interface 400 includes a "no information" box 460 that a rater can select when the audio has no one speaking, an "additional review" box 465 that can be selected to flag the audio for review, and a "personal info" box 470 that can be selected to flag the audio when the candidate reveals too much personal information.

Figure 5:
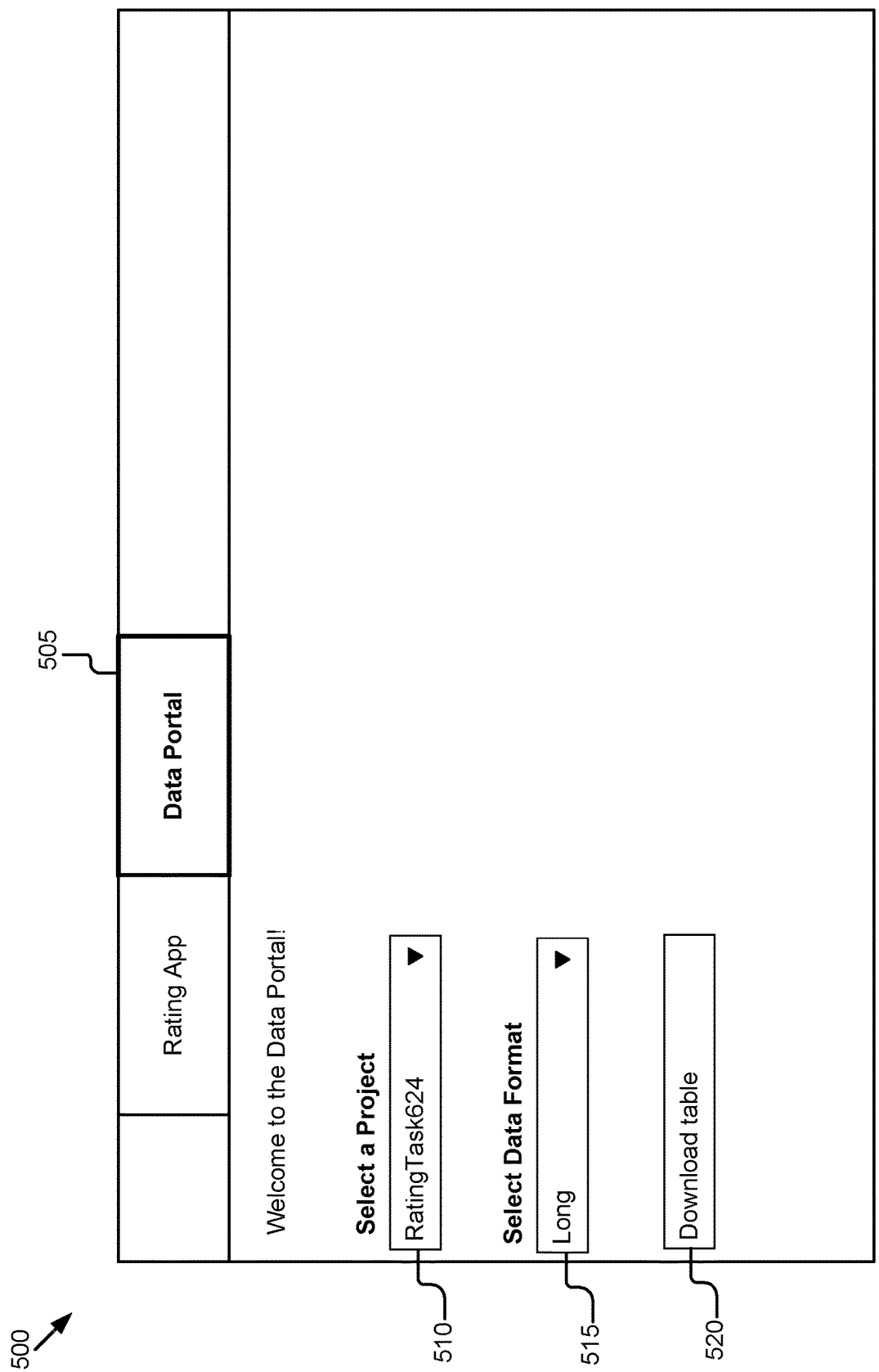
FIG. 5 illustrates an example user interface for a user to select project tasks according to some embodiments.

Turning to FIG. 5, an example user interface 500 is illustrated for a user to select project tasks. In this example, a user reaches the user interface 500 by selecting the data portal tab 505. The data portal allows a user to select a particular project using the project drop-down list 510, select a data format using the data format drop-down list 515, and a box 520 for downloading the table (e.g., as a csv file).

A second type of user is the candidate. The user interface module 212 may generate a user interface to provide the candidate with a coding score that reflects the candidate's ability to code, feedback that includes feedback on the candidate's uncompilable code, a media score that reflects the candidate's performance during the interview, and areas of improvement to improve coding skills and/or interview skills.

In some embodiments, the user interface module 212 receives one or more coding scores and/or media scores from the scoring engine 210 and generates semantic feedback based on the one or more coding scores and/or media scores. The scoring engine 210 may provide scores for programming ability, programming practices, time complexity (if the code is compilable), and a total score where one or more of the coding scores included a penalty for the code being uncompilable. The user interface module 212 may generate graphical data for displaying the one or more scores and the semantic feedback where the semantic feedback includes the score and a description of one or more of logical correctness of the uncompilable code, an algorithmic approach used by the uncompilable code, a programming style of the uncompilable code, a maintainability of the uncompilable code, a recommendation for how to correct logic of the uncompilable code, correct code, a number of compiler errors, a number of test cases, a recommendation to make the uncompilable code compilable, or an identification of one or more lines in the uncompilable code that are uncompilable and one or more alternate lines to correct the uncompilable code.

The user interface module 212 may determine areas of improvement for the candidate and generate graphical data for displaying feedback that includes recommendations to the candidate about areas of improvement. For example, where the feedback is for the programming portion, the user interface module 212 may recommend that the programmer take particular kinds of programming problems specific to the area that needs improvement. The user interface module 212 may also recommend additional resources for improving scores, such as a third-party website for personal tutoring, business classes on how to improve interpersonal skills for work, etc.

Example Methods

Figure 6:
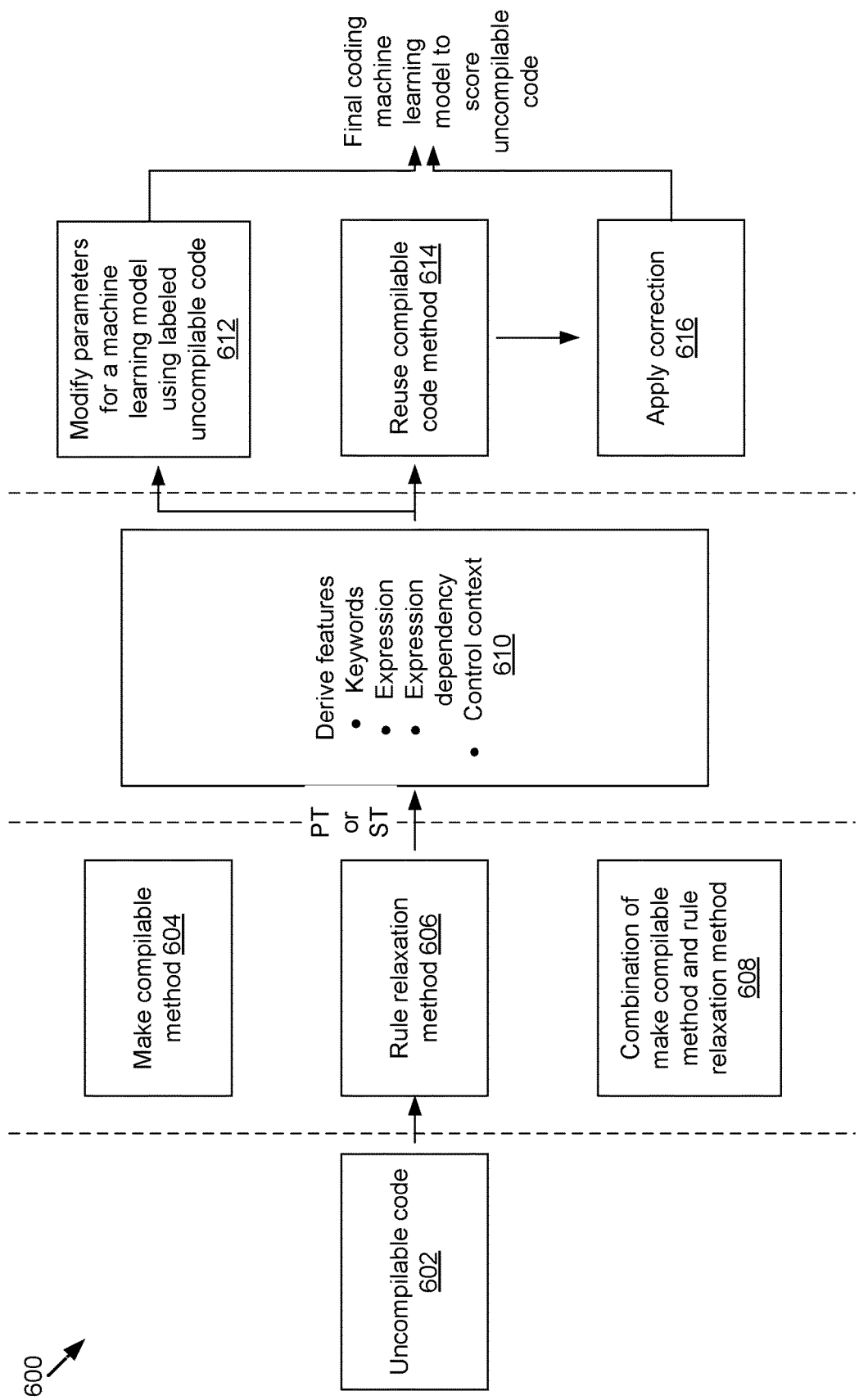
FIG. 6 illustrates a flowchart of an example method to modify the parameters of a coding machine-learning model to analyze uncompilable code according to some embodiments.

FIG. 6 illustrates a flowchart of an example method 600 to modify the parameters of a coding machine-learning model to analyze uncompilable code according to some embodiments. The method 600 may be performed by a rating application 103*a* stored on a server 101, a rating application 103*b* stored on a user device 115, or a rating application 103 stored in part on the server 101 and in part on the user device 115.

At step 602, the rating application 103 receives uncompilable code from a programmer. There are three different ways to process the uncompilable code: either apply the make compilable method, apply the rule relaxation method, or apply a combination of the make compilable method and the rule relaxation method. At step 604, a compilable method is applied. In some embodiments, the compilable method (1) corrects syntax errors, such as by inserting a semicolon that was missed in the code; and (2) applies an n-gram based token prediction model to correct a line of code. At step 406, a rule relaxation method is applied. The rule relaxation method may (1) generate an abstract syntax tree and a symbol table to extract features from the uncompilable code and identify correct statements in the uncompilable code; (2) accept or reinterpret grammatically incorrect statements; and (3) skip the grammatically incorrect statements that are not parseable. At step 608, a combination of the make compilable method and the rule relaxation method are applied.

At step 610, features are derived from the uncompilable code. For example, the parse tree or a symbol table are used to derive the features from the uncompilable code. The features include descriptions of keywords, expressions, expression dependency, and control context.

There are two different ways to modify the parameters for a coding machine-learning model. At step 612, the parameters for a coding machine-learning model are modified using labeled uncompilable code as training data. The coding machine-learning model may be modified to output compilable code that is used for scoring. At step 614, a reuse compilable code method is applied, which uses labelled compilable code. At step 616, a correction is applied to the labeled compilable code to make it suitable for the uncompilable code. For example, the coding machine-learning model may be normalized to make it suitable for the uncompilable code. Once the correction is applied, a final coding machine-learning model outputs data that is used to score uncompilable code.

Figure 7:
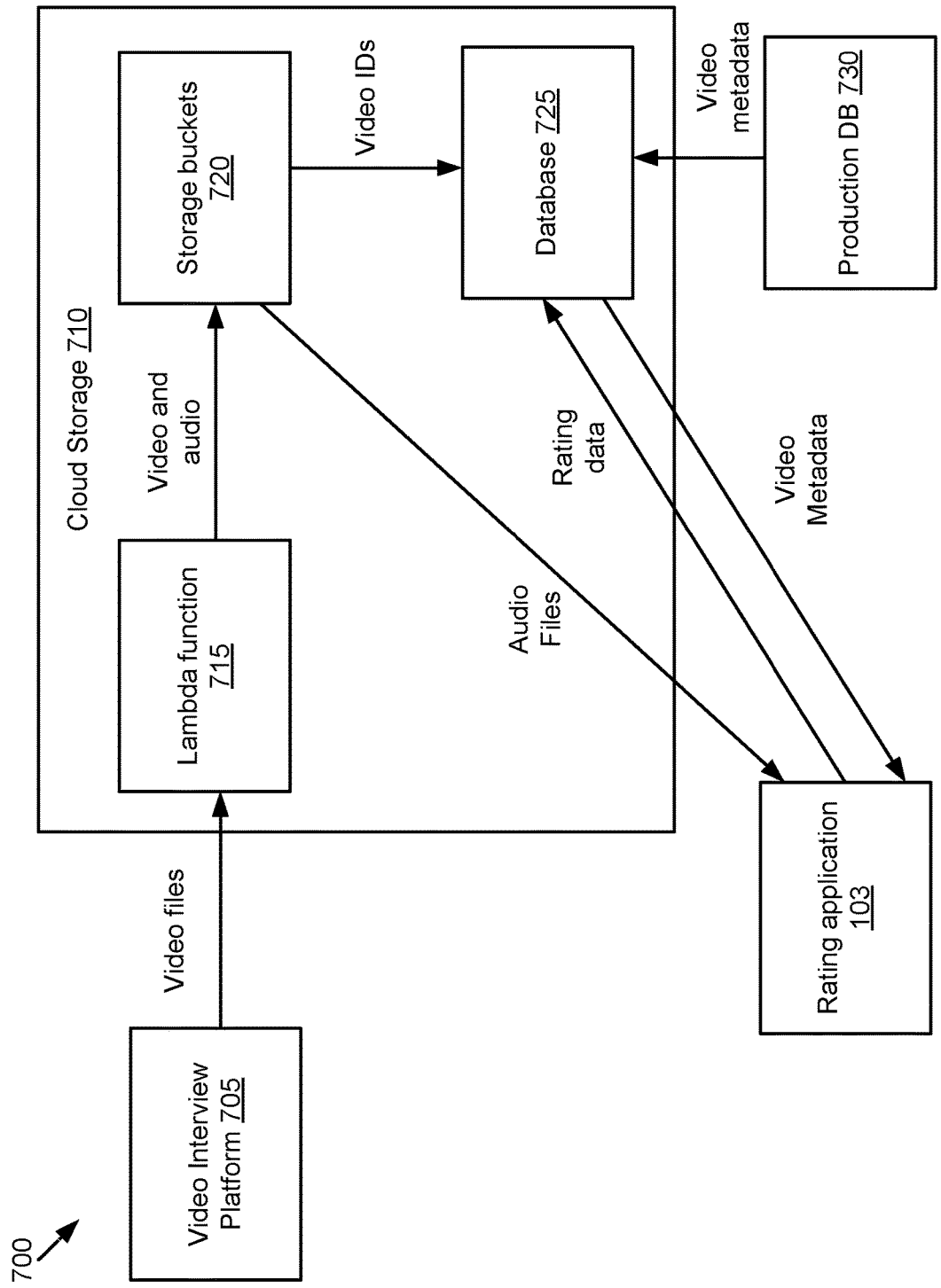
FIG. 7 illustrates a flowchart of an example method to rate the performance of a candidate according to some embodiments.

FIG. 7 illustrates a flowchart of an example method 700, and an example of a storage used during performance of the method, to rate the performance of a candidate according to some embodiments. In some embodiments, a video interview platform 705 is used to record interviews of candidates. Although the video interview platform 705 is illustrated as being separate from the rating application 103, in some embodiments, these are part of the same application. The video interview platform 705 transmits video files of the interview to cloud storage 710. The cloud storage 710 includes a lambda function 715, storage buckets 720, and a database 725. In some embodiments, the cloud storage 710 could be provided by a company, such as Amazon, e.g., Amazon Web Services (AWS). The lambda function 715 (or other suitable function) may be applied to the video files to separate the video file into video and audio. The video and audio are stored in the storage buckets 720. In some embodiments, the storage buckets 720 are part of AWS and are Amazon Simple Storage Service (S3 buckets). The storage buckets 720 provide the audio files to the rating application 103 and provide the video identifiers to the database 725.

The database 725 (e.g. a DynamoDB) may provide metadata by the rating application 103 and receive rating data from the rating application 103. The video metadata is populated before reciting the ratings. In some embodiments, the metadata includes behavioral anchors, which are the low (e.g., 1), medium (e.g., 3), and high (e.g., 5) measures for the ratings; assignments, which is the project that a rater is assigned to with a number of ratings required (nraters) and a time the video file was uploaded (timestamp); the question provided to the user; the filename, which has a file identifier number that matches the file name in the storage bucket 720; and the sound duration, which is the length of the audio file. In some embodiments, the ratings application 103 is configured to not allow a user to rate audio unless the rater has listened to a certain percentage of the audio (95%, 100%, etc.). The rating data received from the ratings application 103 may include review button values; a review time, which is the time that has elapsed between loading the response and submitting the rating; a tracking number, which is a rating session-specific tracking number; and a rating value.

The database 725 may also receive video metadata from a production database 730.

Figure 8:
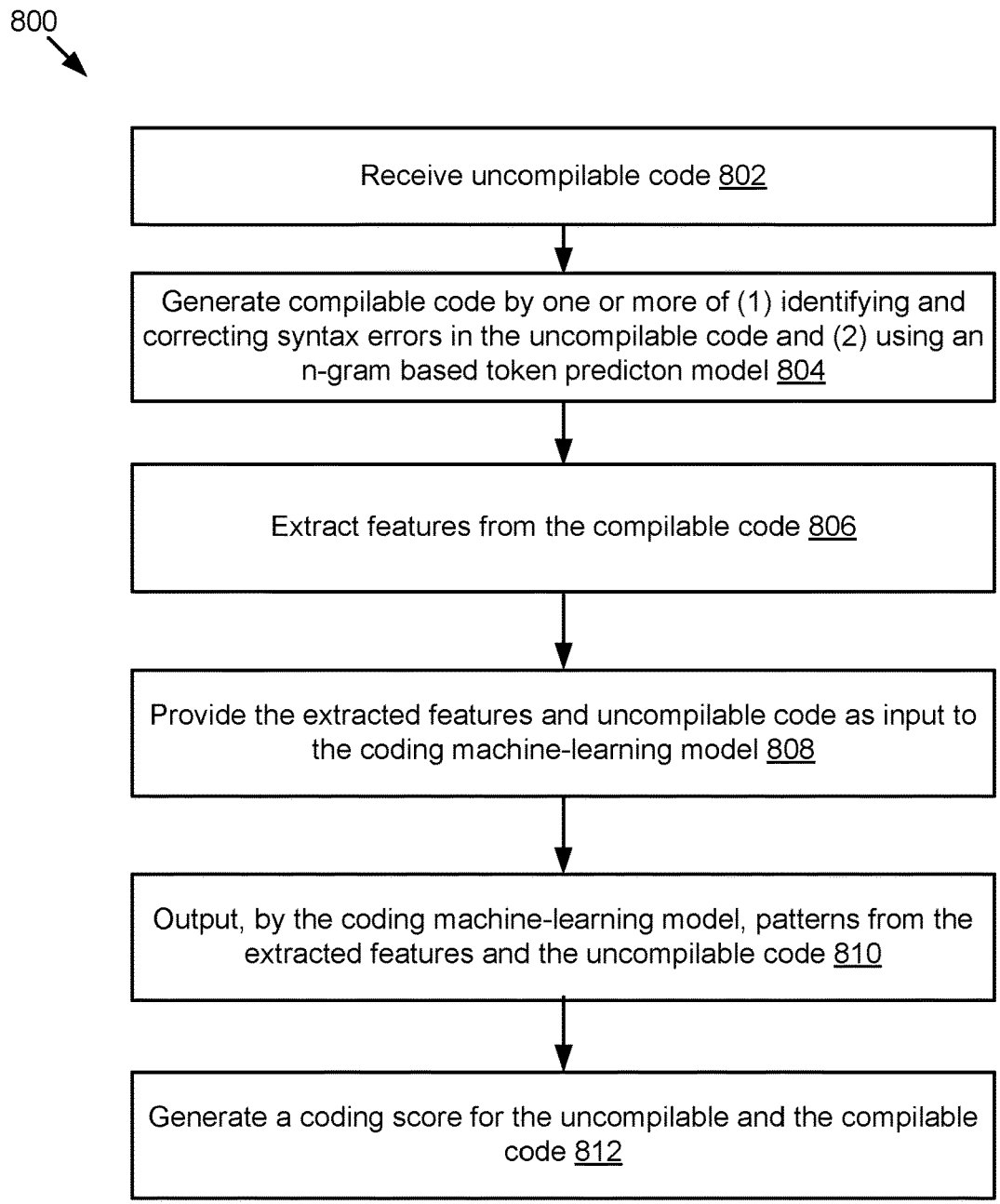
FIG. 8 illustrates a flowchart of an example method to generate compilable and/or parseable code from uncompilable code according to some embodiments.

FIG. 8 illustrates a flowchart of an example method 800 to generate compilable code from uncompilable code according to some embodiments. The method 800 may be performed by a rating application 103a stored on a server 101, a rating application 103b stored on a user device 115, or a rating application 103 stored in part on the server 101 and in part on the user device 115.

At step 802, uncompilable code is received. For example, uncompilable code is received from a programmer. Step 802 may be followed by step 804. At step 804, compilable code is generated by or more of (1) identifying and correcting syntax errors in the uncompilable code and (2) using an n-gram based token prediction model. Step 804 may be followed by step 806. At step 806, features are extracted from the compilable code. Step 806 may be followed by step 808. At step 808, patterns from the extracted features and the uncompilable code are output by the coding machine-learning model. Step 808 may be followed by step 810. At step 810, patterns from the extracted features and the uncompilable code are output by the coding machine-learning model. Step 810 may be followed by step 812. At step 812, a coding score for the uncompilable and the compilable code is generated. For example, the compilable code generated by identifying and correcting syntax errors in the uncompilable code and/or using an n-gram based token prediction model and the compilable code output by the coding machine-learning model are scored.

Figure 9:
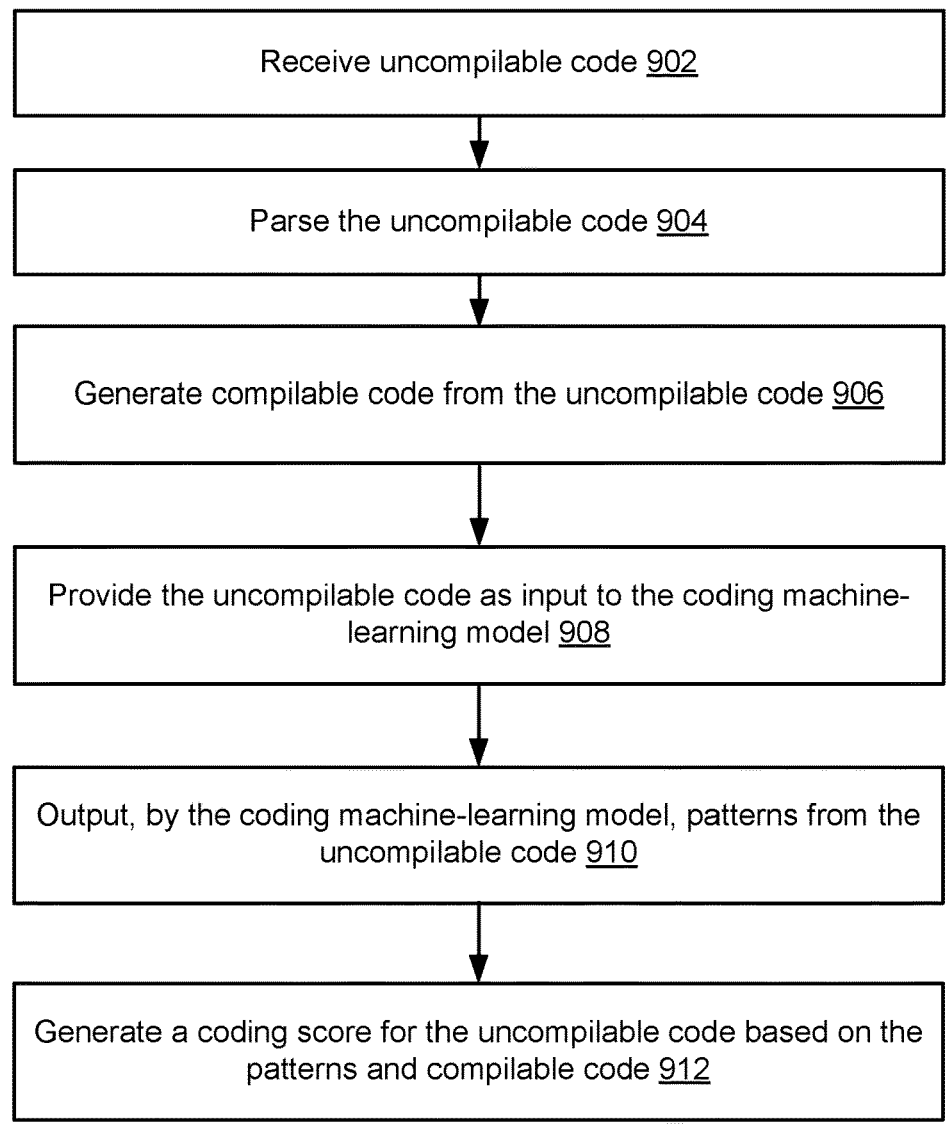
FIG. 9 illustrates a flowchart of an example method to parse uncompilable code and extract features from the uncompilable code according to some embodiments.

FIG. 9 illustrates a flowchart of an example method 900 to parse uncompilable code and extract features from the uncompilable code according to some embodiments. The method 900 may be performed by a rating application 103a stored on a server 101, a rating application 103b stored on a user device 115, or a rating application 103 stored in part on the server 101 and in part on the user device 115.

At step 902, uncompilable code is received. For example, uncompilable code is received from a programmer. Step 902 may be followed by step 904. At step 904, uncompilable code is parsed. For example, a parse tree is created from the uncompilable code. In some embodiments, features may be extracted from the parse tree.

Step 904 may be followed by step 906. At step 906, compilable code is generated from the uncompilable code. Step 906 may be followed by step 908. At step 908, the uncompilable code is provided as input to the coding machine-learning model. Step 910 may be followed by step 912. At step 910, patterns from the uncompilable code are output by the coding machine-learning model. Step 910 may be followed by step 912. At step 912, a coding score for the uncompilable code, based on the patterns, and the compilable code is generated.

Figure 10:
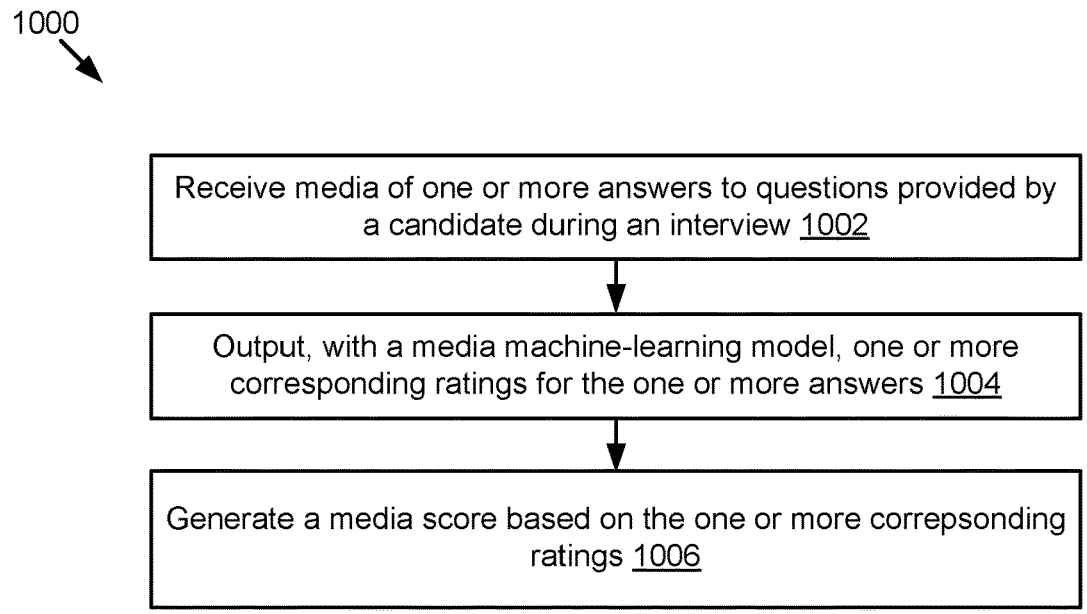
FIG. 10 illustrates a flowchart of an example method to rate the performance of a candidate according to some embodiments.

FIG. 10 illustrates a flowchart of an example method 1000 to rate the performance of a candidate according to some embodiments. The method 1000 may be performed by a rating application 103a stored on a server 101, a rating application 103b stored on a user device 115, or a rating application 103 stored in part on the server 101 and in part on the user device 115.

At step 1002, media of one or more answers to questions provided by a candidate during an interview is received. Step 1002 may be followed by step 1004. At step 1004, one or more corresponding ratings for the one or more answers are output with a media machine-learning model. Step 1004 may be followed by step 1006. At step 1006, a media score is generated based on the one or more corresponding ratings.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a users social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method to generate compilable code from uncompilable code, the method comprising:
   receiving uncompilable code from a candidate;
   generating compilable code from the uncompilable code;
   applying, to the uncompilable code, a make compilable method, a rule relaxation method, or a combination of the make compilable method and the rule relaxation method;
   outputting, with a coding machine-learning model, patterns from the uncompilable code based on the applying, wherein the coding machine-learning model is trained to identify the patterns in the uncompilable code that cause it to be uncompilable
   generating a coding score based on the uncompilable code, the compilable code, and the patterns;
   generating, by using media training data as training input, a media machine-learning model that clusters attributes of different candidates into positive attributes and negative attributes, wherein the media training data includes first media of a series of questions presented to previous candidates, a series of answers provided by the previous candidates, and first corresponding ratings that indicate a correctness of the series of answers;
   receiving, at the media machine-learning model, second media of one or more answers to questions, the second media provided by the candidate during an interview;
   outputting, with the media machine-learning model, one or more second corresponding ratings for the one or more answers;
   generating a media score based on the one or more second corresponding ratings; and
   generating a total score based on the coding score and the media score.

2. The method of claim 1, wherein the first corresponding ratings include information about answers where one or more users disagreed on a rating and how the rating was resolved by a moderator.

3. The method of claim 1, further comprising generating a user interface for one or more users to provide the first corresponding ratings of the first media, wherein the user interface includes an audio clip that corresponds to the first media, a textual version of the questions, and an option for providing the first corresponding ratings.

4. The method of claim 1, further comprising, before outputting the one or more second corresponding ratings, performing an iterative process to refine the media machine-learning model until a set of ratings output by the media machine-learning model match the series of ratings provided by one or more users within a predetermined percentage.

5. The method of claim 1, wherein the second media is audio and further comprising:
   receiving a video of the candidate; and
   separating the audio from the video.

6. The method of claim 1, wherein one or more parameters of the coding machine-learning model are modified based on supervised learning based on coding training data that include labels for code as compilable or uncompilable.

7. The method of claim 1, wherein applying the make compilable method, the rule relation method or the combination of the make compilable method and the rule relation method includes extracting features from the uncompilable code and further comprising:
   providing, as input to the coding machine-learning model, the extracted features of the uncompilable code, wherein the patterns are based on the extracted features of the uncompilable code.

8. The method of claim 1, further comprising identifying the candidate for review by a user for a job, a promotion, or a project if the total score meets a predetermined value.

9. The method of claim 1, wherein a parse tree or a symbol table (ST) is generated to extract features from the uncompilable code.

10. The method of claim 9, wherein one or more parameters of the coding machine-learning model are modified by labeling the compilable code or comparing the extracted features in the compilable code to labeled high-quality compilable code.

11. A non-transitory computer storage medium with instructions to generate compilable code from uncompilable code stored thereon that, when executed by one or more computers, cause the one or more computers to perform operations, the operations comprising:
   receiving uncompilable code from a candidate;
   generating compilable code from the uncompilable code;
   applying, to the uncompilable code, a make compilable method, a rule relaxation method, or a combination of the make compilable method and the rule relaxation method;
   outputting, with a coding machine-learning model, patterns from the uncompilable code based on the applying, wherein the coding machine-learning model is trained to identify the patterns in the uncompilable code that cause it to be uncompilable;
   generating a coding score based on the uncompilable code, the compilable code, and the patterns;
   generating, by using media training data as training input, a media machine-learning model that clusters attributes of different candidates into positive attributes and negative attributes, wherein the media training data includes first media of a series of questions presented to previous candidates, a series of answers provided by the previous candidates, and first corresponding ratings that indicate a correctness of the series of answers;
   receiving, at the media machine-learning model, second media of one or more answers to questions, the second media provided by the candidate during an interview;
   outputting, with the media machine-learning model, one or more second corresponding ratings for the one or more answers;
   generating a media score based on the one or more second corresponding ratings; and
   generating a total score based on the coding score and the media score.

12. The non-transitory computer storage medium of claim 11, wherein the first corresponding ratings include information about answers where one or more users disagreed on a rating and how the rating was resolved by a moderator.

13. The non-transitory computer storage medium of claim 11, wherein the operations further comprise generating a user interface for one or more users to provide the first corresponding ratings of the first media, wherein the user interface includes an audio clip that corresponds to the first media, a textual version of the questions, and an option for providing the first corresponding ratings.

14. The non-transitory computer storage medium of claim 11, wherein the operations further comprise before outputting the one or more second corresponding ratings, performing an iterative process to refine the media machine-learning model until a set of ratings output by the media machine-learning model match the series of ratings provided by one or more users within a predetermined percentage.

15. The non-transitory computer storage medium of claim 11, wherein the second media is audio and the operations further comprise:
   receiving a video of the candidate; and
   separating the audio from the video.

16. A system to generate compilable code from uncompilable code, the system comprising:
   one or more processors; and
   a memory coupled to the one or more processors that stores instructions executed by the one or more processors, the instructions operable to perform operations comprising:
      receiving uncompilable code from a candidate;
      generating compilable code from the uncompilable code;
      applying, to the uncompilable code, a make compilable method, a rule relaxation method, or a combination of the make compilable method and the rule relaxation method;
      outputting, with a coding machine-learning model, patterns from the uncompilable code based on the applying, wherein the coding machine-learning model is trained to identify the patterns in the uncompilable code that cause it to be uncompilable;
      generating a coding score based on the uncompilable code, the compilable code, and the patterns;
      generating, by using media training data as training input, a media machine-learning model that clusters attributes of different candidates into positive attributes and negative attributes, wherein the media training data includes first media of a series of questions presented to previous candidates, a series of answers provided by the previous candidates, and first corresponding ratings that indicate a correctness of the series of answers;
      receiving, at the media machine-learning model, second media of one or more answers to questions, the second media provided by the candidate during an interview;
      outputting, with the media machine-learning model, one or more second corresponding ratings for the one or more answers;
      generating a media score based on the one or more second corresponding ratings; and
      generating a total score based on the coding score and the media score.

17. The system of claim 16, wherein the first corresponding ratings include information about answers where one or more users disagreed on a rating and how the rating was resolved by a moderator.

18. The system of claim 16, wherein the operations further comprise generating a user interface for one or more users to provide the first corresponding ratings of the first media, wherein the user interface includes an audio clip that corresponds to the first media, a textual version of the questions, and an option for providing the first corresponding ratings.

19. The system of claim 16, wherein the operations further comprise, before outputting the one or more second corresponding ratings, performing an iterative process to refine the media machine-learning model until a set of ratings output by the media machine-learning model match the series of ratings provided by one or more users within a predetermined percentage.

20. The system of claim 16, wherein the second media is audio and the operations further comprise:
- receiving a video of the candidate; and
- separating the audio from the video.

* * * * *